Nov. 5, 1940.   J. C. CARTER   2,220,395
MEANS FOR SECURING A FLOAT TO A FISHING ROD
Filed Aug. 1, 1938
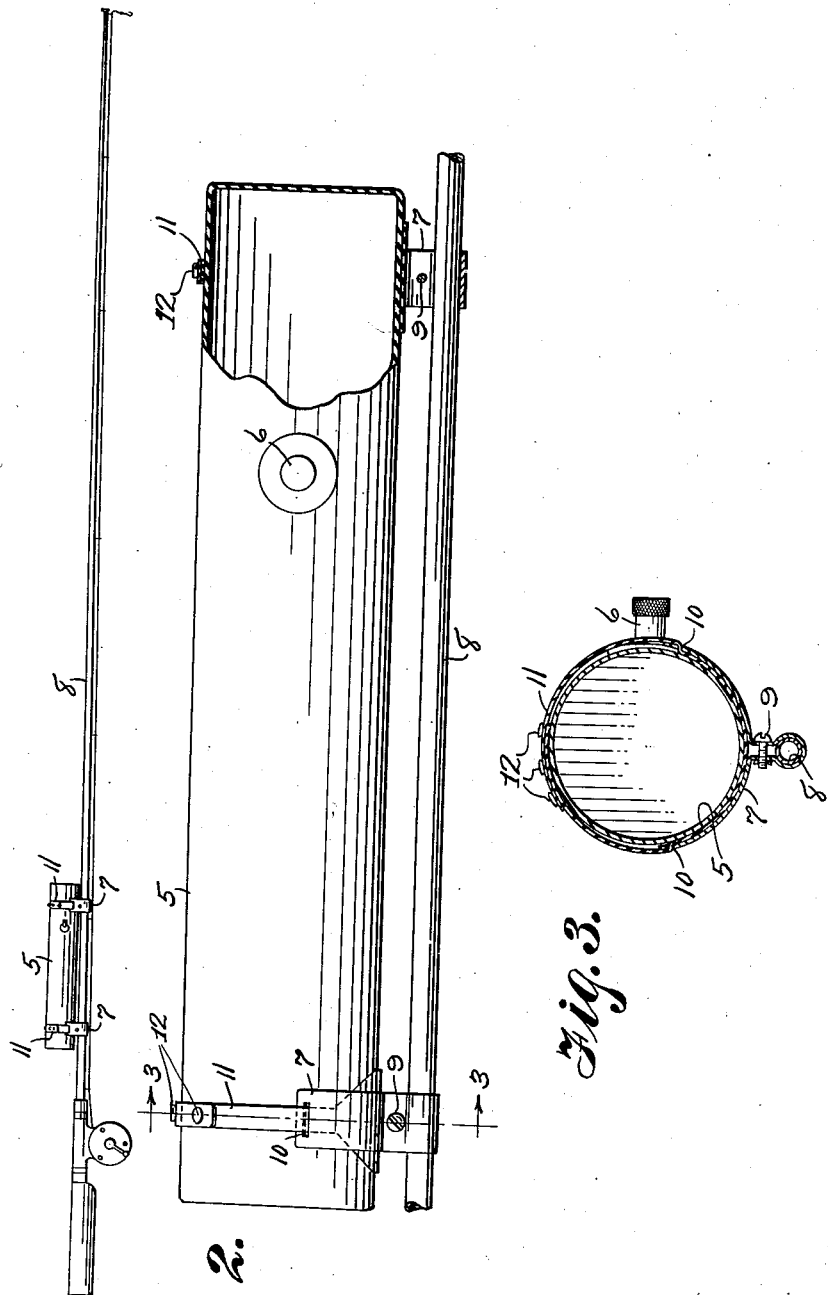
James C. Carter
INVENTOR
BY Victor J. Evans & Co.
ATTORNEYS Patented Nov. 5, 1940

2,220,395

UNITED STATES PATENT OFFICE 2,220,395

MEANS FOR SECURING A FLOAT TO A FISHING ROD

James C. Carter, Detroit, Mich.

Application August 1, 1938, Serial No. 222,495

1 Claim. (Cl. 24—81)

My invention relates to fishing tackle and more particularly to an attachment for fishing rods and the like, it being one of the principal objects of my invention to provide a device for attachment to a fishing rod for securing to said rod a float whereby to preclude the rod from sinking if the latter should accidentally fall into the water.

Another object of my invention is to provide an attachment of the above described character which is easily attached to rods already in use without modifying the same.

A further object of my invention is to provide a device of the above described character which is simple in construction, durable in use, efficient in operation, and economical in manufacture.

Other objects and advantages will be apparent from the following description, appended claim and annexed drawing.

Referring to the drawing wherein like reference characters designate like parts throughout the several views:

Figure 1 is a side elevation of a fishing rod having my invention applied thereto.

Figure 2 is an enlarged side elevation, partly in section, illustrating my invention as applied to a section of a fishing rod.

Figure 3 is a sectional view taken on the line 3—3 of Figure 2.

In practicing my invention I provide an inflatable elongated cylindrical shaped bag 5, preferably constructed of rubber or the like, equipped with an air intake valve 6 whereby said bag may be inflated with air as clearly illustrated in the drawing. Adjacent the end of the bag and inwardly thereof I provide a pair of spaced brackets 7 clamped about a section of a fishing rod 8 adjacent the handle of the latter. Each of said brackets is preferably of a one piece construction bent intermediate thereof to form a looped section embracing the rod 8 and secured thereabout by screws 9 as clearly illustrated in Figure 3. The free end sections of each of the brackets are spaced relative to each other and are of an arcuate configuration to form a yoke embracing the bag. Each of said end sections is provided with slots 10 adjacent the ends thereof and receives therethrough a strap 11 encompassing said bag and secured thereon by snap fasteners 12 fixed to the overlapping ends of each of said straps. However, it is to be understood that buckles may be employed to secure the straps about said bag. The lower sections of the straps interpose the yoke and the bag and are of a greater width than the upper sections of said straps whereby to protect the lower sections of said bag from damage from said yokes caused by wear or the like.

From the foregoing it will be apparent that I have provided a simple and efficient attachment for fishing rods and the like whereby the same may be easily attached thereto to maintain a section of the rod floatable in case said rod should accidentally fall into the water. By the use of my device the fishing rod or the like may be readily retrieved from the water without difficulty and by deflating the bag of my device the same may be readily carried or stored as desired.

What I claim is:

In a device of the character described, a bracket adapted to secure a buoy to a fishing rod and comprising a pair of arcuate-shaped oppositely disposed arms adapted to embrace said buoy and provided with outwardly disposed end sections formed with slots, said arms having angularly disposed adjacent end sections terminating in a loop portion integrally connecting said adjacent end sections together and adapted to receive therethrough said rod, a screw extending through said adjacent end sections and operable to move said adjacent end sections together to effect clamping of said rod within said loop portion, a strap seated within said arms and having connected end sections extending through said slots for securing said buoy to said bracket.

JAMES C. CARTER.